US011275513B2

(12) United States Patent
Dalmatov et al.

(10) Patent No.: US 11,275,513 B2
(45) Date of Patent: Mar. 15, 2022

(54) SYSTEM AND METHOD FOR SELECTING A REDUNDANT ARRAY OF INDEPENDENT DISKS (RAID) LEVEL FOR A STORAGE DEVICE SEGMENT EXTENT

(71) Applicant: EMC IP Holding Company LLC, Hopkinton, MA (US)

(72) Inventors: Nickolay Dalmatov, St. Petersburg (RU); Mikhail Danilov, St. Petersburg (RU)

(73) Assignee: EMC IP HOLDING COMPANY, LLC, Hopkinton, MA (US)

( * ) Notice: Subject to any disclaimer, the term of this patent is extended or adjusted under 35 U.S.C. 154(b) by 0 days.

(21) Appl. No.: 16/882,026

(22) Filed: May 22, 2020

(65) Prior Publication Data

US 2021/0132822 A1    May 6, 2021

(51) Int. Cl.
*G06F 3/06* (2006.01)
*G06F 11/10* (2006.01)

(52) U.S. Cl.
CPC .......... *G06F 3/0619* (2013.01); *G06F 3/0644* (2013.01); *G06F 3/0689* (2013.01); *G06F 11/1076* (2013.01)

(58) Field of Classification Search
None
See application file for complete search history.

(56) References Cited

U.S. PATENT DOCUMENTS

| 7,580,956 B1* | 8/2009 | Xin ........................ G06F 16/10 |
| 8,839,046 B2* | 9/2014 | McLean .............. G06F 11/3409 |
| | | 714/47.2 |
| 2012/0079318 A1* | 3/2012 | Colgrove .............. G06F 3/0646 |
| | | 714/6.22 |
| 2017/0270002 A1* | 9/2017 | Gao .................... G06F 11/3485 |
| 2018/0081571 A1* | 3/2018 | Akshara ................ G06F 3/0653 |
| 2018/0088857 A1* | 3/2018 | Gao ........................ G06F 3/061 |

* cited by examiner

*Primary Examiner* — Kaushikkumar M Patel

(74) *Attorney, Agent, or Firm* — Brian J. Colandreo; Mark H. Whittenberger; Holland & Knight LLP

(57) ABSTRACT

A method, computer program product, and computing system for receiving telemetry data associated with a plurality of storage devices. A storage device reliability level may be defined for each storage device based upon, at least in part, the telemetry data associated with the plurality of storage devices. Each storage device may be partitioned into a plurality of storage device segments. A storage device segment reliability level may be defined for the plurality of storage device segments based upon, at least in part, the storage device reliability level of the plurality of storage devices. A subset of the plurality of storage device segments may be combined, thus defining a storage device segment extent. A RAID level for the storage device segment extent may be selected based upon, at least in part, the storage device segment reliability level of each storage device segment of the storage device segment extent.

20 Claims, 9 Drawing Sheets

SYSTEM AND METHOD FOR SELECTING A REDUNDANT ARRAY OF INDEPENDENT DISKS (RAID) LEVEL FOR A STORAGE DEVICE SEGMENT EXTENT

RELATED APPLICATIONS

This application claims priority to Russian Patent Application No. 2019134842, filed on Oct. 30, 2019 entitled "System and Method for Selecting a Redundant Array of Independent Disks (RAID) Level for a Storage Device Segment Extent", the contents of which is herein incorporated by reference in its entirety.

BACKGROUND

Storing and safeguarding electronic content may be beneficial in modern business and elsewhere. Accordingly, various methodologies may be employed to protect and distribute such electronic content.

Physical drives often fail and the most common way to protect the data is to apply a certain Redundant Array Of Independent Disks (RAID) technology by distributing the data and the parity (i.e., error correction codes) between different physical drives. If a physical drive fails, data can be restored from the other physical drives. However, different physical drives have different error rates and, therefore, different probabilities of failing. If a group of physical drives has multiple faulty drives, the probability of data loss increases.

SUMMARY OF DISCLOSURE

In one example implementation, a computer-implemented method executed on a computing device may include, but is not limited to, receiving telemetry data associated with a plurality of storage devices. A storage device reliability level may be defined for each storage device of the plurality of storage devices based upon, at least in part, the telemetry data associated with the plurality of storage devices. Each storage device of the plurality of storage devices may be partitioned into a plurality of storage device segments. A storage device segment reliability level may be defined for the plurality of storage device segments based upon, at least in part, the storage device reliability level of the plurality of storage devices. A subset of the plurality of storage device segments may be combined, thus defining a storage device segment extent. A Redundant Array Of Independent Disks (RAID) level for the storage device segment extent may be selected based upon, at least in part, the storage device segment reliability level of each storage device segment of the storage device segment extent.

One or more of the following example features may be included. Defining the storage device reliability level for the plurality of storage devices may include comparing the telemetry data to one or more threshold reliability values. Defining the storage device reliability level for the plurality of storage devices may include defining the reliability level for each storage device as one of reliable and unreliable. Defining the storage device segment reliability level for the plurality of storage device segments may include defining the reliability level for each storage device segment as one of reliable and unreliable. Selecting the RAID level for the storage device segment extent may include identifying a number of reliable storage device segments and a number of unreliable storage device segments in the storage device segment extent. Selecting the RAID level for the storage device segment extent may include one or more of: selecting a RAID level with a single parity when each storage device segment of the storage device segment extent is reliable, selecting a RAID level with a double parity when only one storage device segment of the storage device segment extent is unreliable, and selecting a RAID level with mirroring protection when more than one storage device segment is unreliable. One or more storage device segments may be added to the storage device segment extent based upon, at least in part, the selected RAID level for the storage device segment extent. One or more storage device segments may be removed from the storage device segment extent based upon, at least in part, the selected RAID level for the storage device segment extent.

In another example implementation, a computer program product resides on a computer readable medium that has a plurality of instructions stored on it. When executed by a processor, the instructions cause the processor to perform operations that may include, but are not limited to, receiving telemetry data associated with a plurality of storage devices. A storage device reliability level may be defined for each storage device of the plurality of storage devices based upon, at least in part, the telemetry data associated with the plurality of storage devices. Each storage device of the plurality of storage devices may be partitioned into a plurality of storage device segments. A storage device segment reliability level may be defined for the plurality of storage device segments based upon, at least in part, the storage device reliability level of the plurality of storage devices. A subset of the plurality of storage device segments may be combined, thus defining a storage device segment extent. A Redundant Array Of Independent Disks (RAID) level for the storage device segment extent may be selected based upon, at least in part, the storage device segment reliability level of each storage device segment of the storage device segment extent.

One or more of the following example features may be included. Defining the storage device reliability level for the plurality of storage devices may include comparing the telemetry data to one or more threshold reliability values. Defining the storage device reliability level for the plurality of storage devices may include defining the reliability level for each storage device as one of reliable and unreliable. Defining the storage device segment reliability level for the plurality of storage device segments may include defining the reliability level for each storage device segment as one of reliable and unreliable. Selecting the RAID level for the storage device segment extent may include identifying a number of reliable storage device segments and a number of unreliable storage device segments in the storage device segment extent. Selecting the RAID level for the storage device segment extent may include one or more of: selecting a RAID level with a single parity when each storage device segment of the storage device segment extent is reliable, selecting a RAID level with a double parity when only one storage device segment of the storage device segment extent is unreliable, and selecting a RAID level with mirroring protection when more than one storage device segment is unreliable. One or more storage device segments may be added to the storage device segment extent based upon, at least in part, the selected RAID level for the storage device segment extent. One or more storage device segments may be removed from the storage device segment extent based upon, at least in part, the selected RAID level for the storage device segment extent.

In another example implementation, a computing system includes at least one memory architecture and at least one processor configured to receive telemetry data associated with a plurality of storage devices. A storage device reliability level may be defined for each storage device of the plurality of storage devices based upon, at least in part, the telemetry data associated with the plurality of storage devices. Each storage device of the plurality of storage devices may be partitioned into a plurality of storage device segments. A storage device segment reliability level may be defined for the plurality of storage device segments based upon, at least in part, the storage device reliability level of the plurality of storage devices. A subset of the plurality of storage device segments may be combined, thus defining a storage device segment extent. A Redundant Array Of Independent Disks (RAID) level for the storage device segment extent may be selected based upon, at least in part, the storage device segment reliability level of each storage device segment of the storage device segment extent.

One or more of the following example features may be included. Defining the storage device reliability level for the plurality of storage devices may include comparing the telemetry data to one or more threshold reliability values. Defining the storage device reliability level for the plurality of storage devices may include defining the reliability level for each storage device as one of reliable and unreliable. Defining the storage device segment reliability level for the plurality of storage device segments may include defining the reliability level for each storage device segment as one of reliable and unreliable. Selecting the RAID level for the storage device segment extent may include identifying a number of reliable storage device segments and a number of unreliable storage device segments in the storage device segment extent. Selecting the RAID level for the storage device segment extent may include one or more of: selecting a RAID level with a single parity when each storage device segment of the storage device segment extent is reliable, selecting a RAID level with a double parity when only one storage device segment of the storage device segment extent is unreliable, and selecting a RAID level with mirroring protection when more than one storage device segment is unreliable. One or more storage device segments may be added to the storage device segment extent based upon, at least in part, the selected RAID level for the storage device segment extent. One or more storage device segments may be removed from the storage device segment extent based upon, at least in part, the selected RAID level for the storage device segment extent.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

BRIEF DESCRIPTION OF THE DRAWINGS

Like reference symbols in the various drawings indicate like elements.

DETAILED DESCRIPTION

Figure 1:
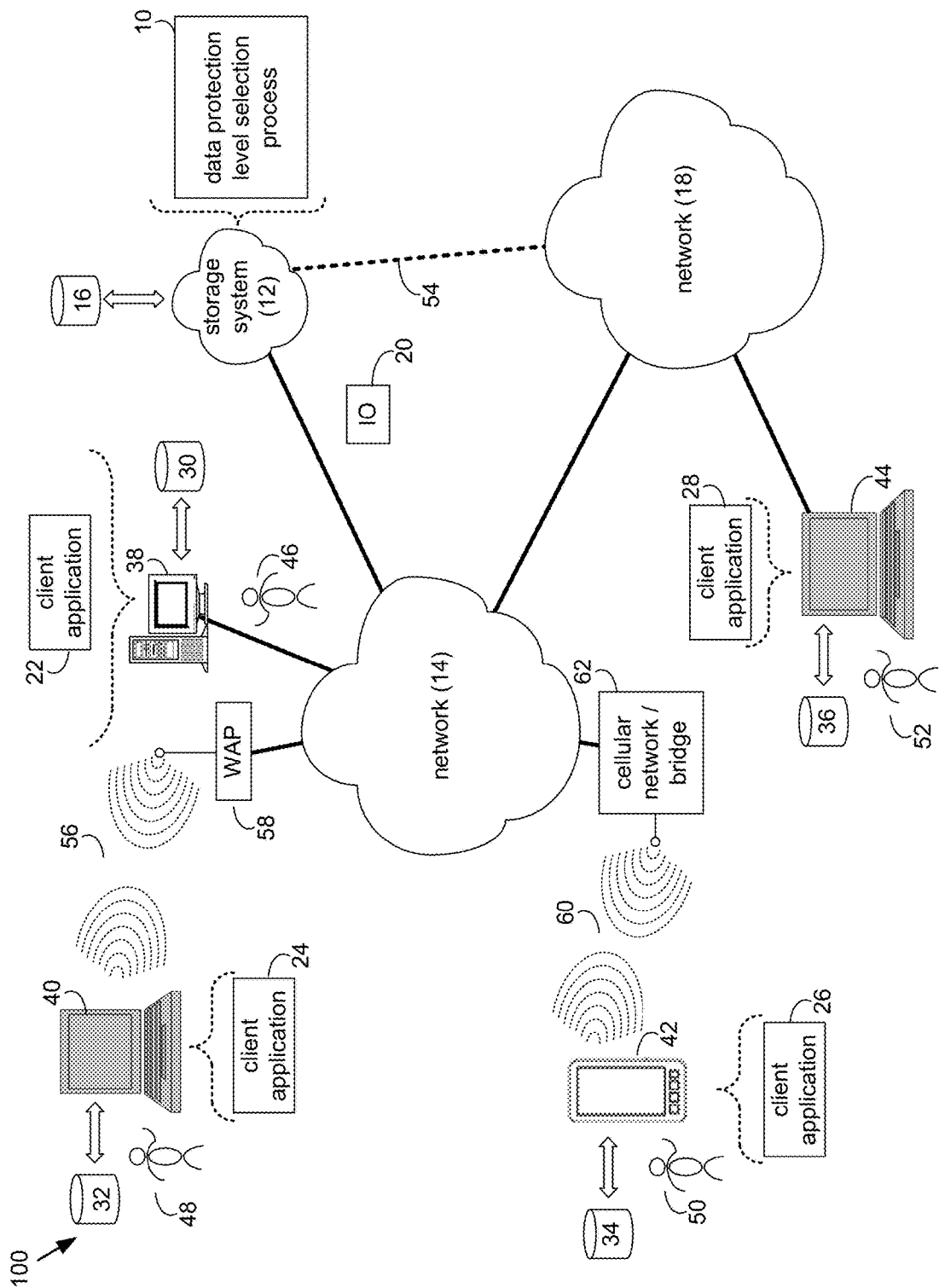
FIG. 1 is an example diagrammatic view of a storage system and a data protection level selection process coupled to a distributed computing network according to one or more example implementations of the disclosure.

System Overview:

Referring to FIG. 1, there is shown data protection level selection process 10 that may reside on and may be executed by storage system 12, which may be connected to network 14 (e.g., the Internet or a local area network). Examples of storage system 12 may include, but are not limited to: a Network Attached Storage (NAS) system, a Storage Area Network (SAN), a personal computer with a memory system, a server computer with a memory system, and a cloud-based device with a memory system.

As is known in the art, a SAN may include one or more of a personal computer, a server computer, a series of server computers, a mini computer, a mainframe computer, a RAID device and a NAS system. The various components of storage system 12 may execute one or more operating systems, examples of which may include but are not limited to: Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

The instruction sets and subroutines of data protection level selection process 10, which may be stored on storage device 16 included within storage system 12, may be executed by one or more processors (not shown) and one or more memory architectures (not shown) included within storage system 12. Storage device 16 may include but is not limited to: a hard disk drive; a tape drive; an optical drive; a RAID device; a random access memory (RAM); a read-only memory (ROM); and all forms of flash memory storage devices. Additionally/alternatively, some portions of the instruction sets and subroutines of data protection level selection process 10 may be stored on storage devices (and/or executed by processors and memory architectures) that are external to storage system 12.

Network 14 may be connected to one or more secondary networks (e.g., network 18), examples of which may include but are not limited to: a local area network; a wide area network; or an intranet, for example.

Various IO requests (e.g. IO request 20) may be sent from client applications 22, 24, 26, 28 to storage system 12. Examples of IO request 20 may include but are not limited to data write requests (e.g., a request that content be written to storage system 12) and data read requests (e.g., a request that content be read from storage system 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID devices; random access memories (RAM); read-only memories (ROM), and all forms of flash memory storage devices. Examples of client electronic devices 38, 40, 42, 44 may include, but are not limited to, personal computer 38, laptop computer 40, smartphone 42, notebook computer 44, a server (not shown), a data-enabled, cellular telephone (not shown), and a dedicated network device (not shown).

Users 46, 48, 50, 52 may access storage system 12 directly through network 14 or through secondary network 18. Further, storage system 12 may be connected to network 14 through secondary network 18, as illustrated with link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (e.g., WAP) 58, which is shown directly coupled to network 14. WAP 58 may be, for example, an IEEE 802.11a, 802.11b, 802.11g, 802.11n, Wi-Fi, and/or Bluetooth device that is capable of establishing wireless communication channel 56 between laptop computer 40 and WAP 58. Smartphone 42 is shown wirelessly coupled to network 14 via wireless communication channel 60 established between smartphone 42 and cellular network/bridge 62, which is shown directly coupled to network 14.

Client electronic devices 38, 40, 42, 44 may each execute an operating system, examples of which may include but are not limited to Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

In some implementations, as will be discussed below in greater detail, a data protection level selection process, such as data protection level selection process 10 of FIG. 1, may include but is not limited to, receiving telemetry data associated with a plurality of storage devices. A storage device reliability level may be defined for each storage device of the plurality of storage devices based upon, at least in part, the telemetry data associated with the plurality of storage devices. Each storage device of the plurality of storage devices may be partitioned into a plurality of storage device segments. A storage device reliability level may be defined for the plurality of storage device segments based upon, at least in part, the storage device reliability level of the plurality of storage devices. A subset of the plurality of storage device segments may be combined, thus defining a storage device segment extent. A Redundant Array Of Independent Disks (RAID) level for the storage device segment extent may be selected based upon, at least in part, the storage device segment reliability level of each storage device segment of the storage device segment extent.

For example purposes only, storage system 12 will be described as being a network-based storage system that includes a plurality of electro-mechanical backend storage devices. However, this is for example purposes only and is not intended to be a limitation of this disclosure, as other configurations are possible and are considered to be within the scope of this disclosure.

Figure 2:
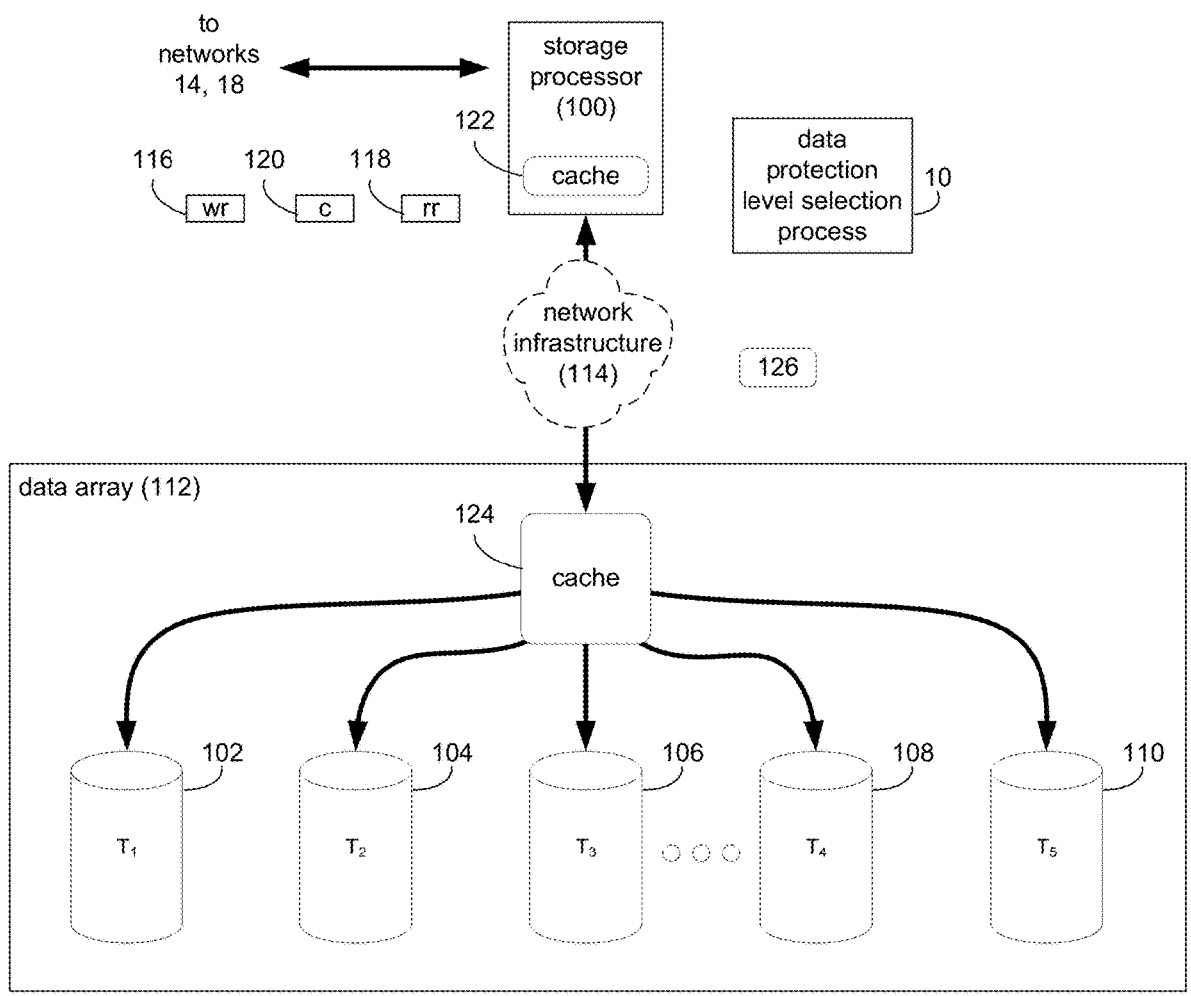
FIG. 2 is an example diagrammatic view of the storage system of FIG. 1 according to one or more example implementations of the disclosure.
Figure 3:
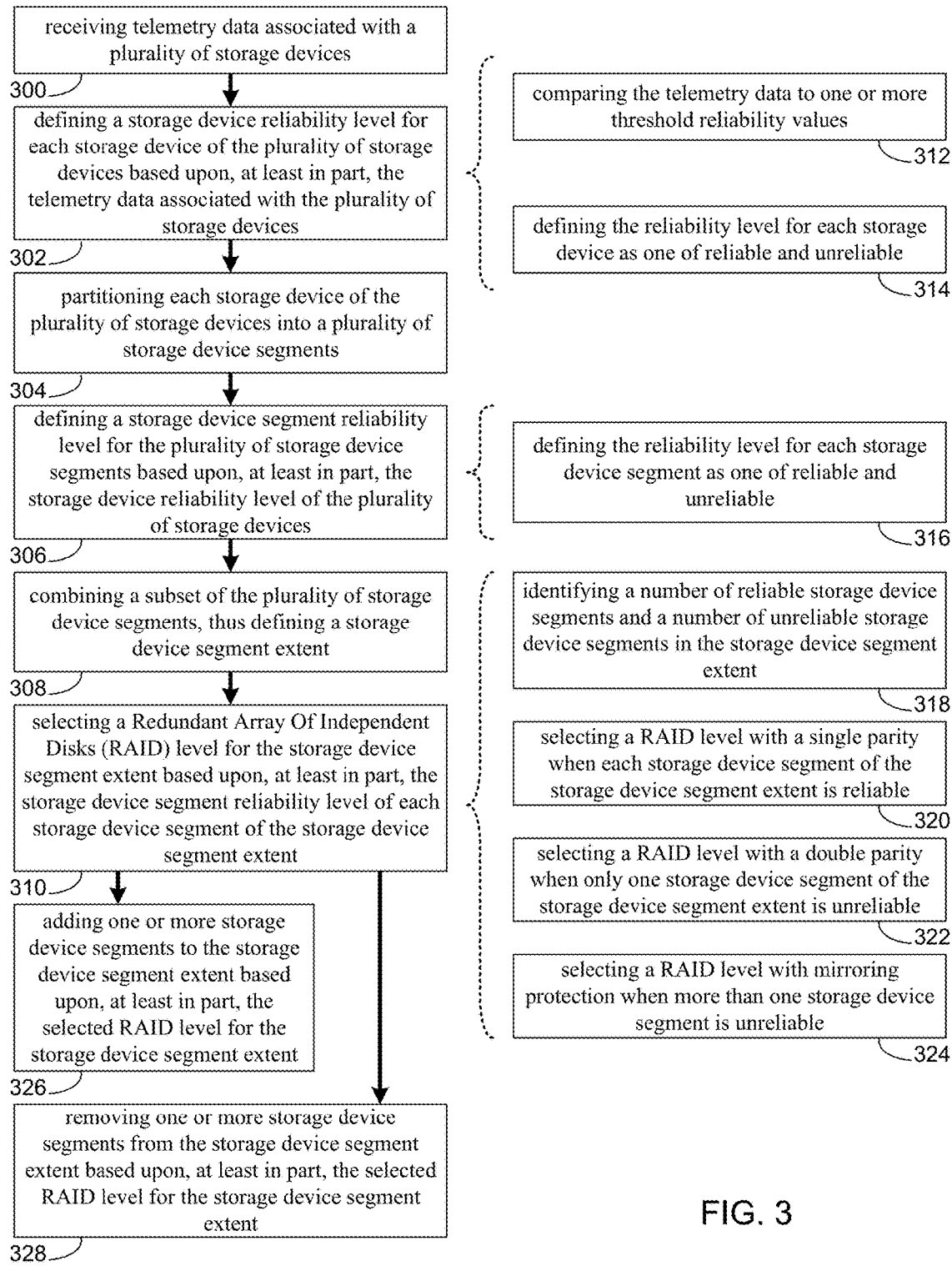
FIG. 3 is an example flowchart of the data protection level selection process of FIG. 1 according to one or more example implementations of the disclosure.

The Storage System:

Referring also to FIG. 2, storage system 12 may include storage processor 100 and a plurality of storage targets T 1–n (e.g., storage targets 102, 104, 106, 108). Storage targets 102, 104, 106, 108 may be configured to provide various levels of performance and/or high availability. For example, one or more of storage targets 102, 104, 106, 108 may be configured as a RAID 0 array, in which data is striped across storage targets. By striping data across a plurality of storage targets, improved performance may be realized. However, RAID 0 arrays do not provide a level of high availability. Accordingly, one or more of storage targets 102, 104, 106, 108 may be configured as a RAID 1 array, in which data is mirrored between storage targets. By mirroring data between storage targets, a level of high availability is achieved as multiple copies of the data are stored within storage system 12.

While storage targets 102, 104, 106, 108 are discussed above as being configured in a RAID 0 or RAID 1 array, this is for example purposes only and is not intended to be a limitation of this disclosure, as other configurations are possible. For example, storage targets 102, 104, 106, 108 may be configured as a RAID 3, RAID 4, RAID 5 or RAID 6 array.

While in this particular example, storage system 12 is shown to include four storage targets (e.g. storage targets 102, 104, 106, 108), this is for example purposes only and is not intended to be a limitation of this disclosure. Specifically, the actual number of storage targets may be increased or decreased depending upon e.g., the level of redundancy/performance/capacity required.

Storage system 12 may also include one or more coded targets 110. As is known in the art, a coded target may be used to store coded data that may allow for the regeneration of data lost/corrupted on one or more of storage targets 102, 104, 106, 108. An example of such a coded target may include but is not limited to a hard disk drive that is used to store parity data within a RAID array.

While in this particular example, storage system 12 is shown to include one coded target (e.g., coded target 110), this is for example purposes only and is not intended to be a limitation of this disclosure. Specifically, the actual number of coded targets may be increased or decreased depending upon e.g. the level of redundancy/performance/capacity required.

Examples of storage targets 102, 104, 106, 108 and coded target 110 may include one or more electro-mechanical hard disk drives and/or solid-state/flash devices, wherein a combination of storage targets 102, 104, 106, 108 and coded target 110 and processing/control systems (not shown) may form data array 112.

The manner in which storage system 12 is implemented may vary depending upon e.g. the level of redundancy/ performance/capacity required. For example, storage system 12 may be a RAID device in which storage processor 100 is a RAID controller card and storage targets 102, 104, 106, 108 and/or coded target 110 are individual "hot-swappable" hard disk drives. Another example of such a RAID device may include but is not limited to an NAS device. Alternatively, storage system 12 may be configured as a SAN, in which storage processor 100 may be e.g., a server computer and each of storage targets 102, 104, 106, 108 and/or coded target 110 may be a RAID device and/or computer-based hard disk drives. Further still, one or more of storage targets 102, 104, 106, 108 and/or coded target 110 may be a SAN.

In the event that storage system 12 is configured as a SAN, the various components of storage system 12 (e.g. storage processor 100, storage targets 102, 104, 106, 108, and coded target 110) may be coupled using network infrastructure 114, examples of which may include but are not limited to an Ethernet (e.g., Layer 2 or Layer 3) network, a fiber channel network, an InfiniBand network, or any other circuit switched/packet switched network.

Storage system 12 may execute all or a portion of data protection level selection process 10. The instruction sets and subroutines of data protection level selection process 10, which may be stored on a storage device (e.g., storage device 16) coupled to storage processor 100, may be executed by one or more processors (not shown) and one or more memory architectures (not shown) included within storage processor 100. Storage device 16 may include but is not limited to: a hard disk drive; a tape drive; an optical drive; a RAID device; a random access memory (RAM); a read-only memory (ROM); and all forms of flash memory storage devices. As discussed above, some portions of the instruction sets and subroutines of data protection level selection process 10 may be stored on storage devices (and/or executed by processors and memory architectures) that are external to storage system 12.

As discussed above, various IO requests (e.g. IO request 20) may be generated. For example, these IO requests may be sent from client applications 22, 24, 26, 28 to storage system 12. Additionally/alternatively and when storage processor 100 is configured as an application server, these IO requests may be internally generated within storage processor 100. Examples of IO request 20 may include but are not limited to data write request 116 (e.g., a request that content 118 be written to storage system 12) and data read request 120 (i.e. a request that content 118 be read from storage system 12).

During operation of storage processor 100, content 118 to be written to storage system 12 may be processed by storage processor 100. Additionally/alternatively and when storage processor 100 is configured as an application server, content 118 to be written to storage system 12 may be internally generated by storage processor 100.

Storage processor 100 may include frontend cache memory system 122. Examples of frontend cache memory system 122 may include but are not limited to a volatile, solid-state, cache memory system (e.g., a dynamic RAM cache memory system) and/or a non-volatile, solid-state, cache memory system (e.g., a flash-based, cache memory system).

Storage processor 100 may initially store content 118 within frontend cache memory system 122. Depending upon the manner in which frontend cache memory system 122 is configured, storage processor 100 may immediately write content 118 to data array 112 (if frontend cache memory system 122 is configured as a write-through cache) or may subsequently write content 118 to data array 112 (if frontend cache memory system 122 is configured as a write-back cache).

Data array 112 may include backend cache memory system 124. Examples of backend cache memory system 124 may include but are not limited to a volatile, solid-state, cache memory system (e.g., a dynamic RAM cache memory system) and/or a non-volatile, solid-state, cache memory system (e.g., a flash-based, cache memory system). During operation of data array 112, content 118 to be written to data array 112 may be received from storage processor 100. Data array 112 may initially store content 118 within backend cache memory system 124 prior to being stored on e.g. one or more of storage targets 102, 104, 106, 108, and coded target 110.

As discussed above, the instruction sets and subroutines of data protection level selection process 10, which may be stored on storage device 16 included within storage system 12, may be executed by one or more processors (not shown) and one or more memory architectures (not shown) included within storage system 12. Accordingly, in addition to being executed on storage processor 100, some or all of the instruction sets and subroutines of data protection level selection process 10 may be executed by one or more processors (not shown) and one or more memory architectures (not shown) included within data array 112.

Further and as discussed above, during the operation of data array 112, content (e.g., content 118) to be written to data array 112 may be received from storage processor 100 and initially stored within backend cache memory system 124 prior to being stored on e.g. one or more of storage targets 102, 104, 106, 108, 110. Accordingly, during use of data array 112, backend cache memory system 124 may be populated (e.g., warmed) and, therefore, subsequent read requests may be satisfied by backend cache memory system 124 (e.g., if the content requested in the read request is present within backend cache memory system 124), thus avoiding the need to obtain the content from storage targets 102, 104, 106, 108, 110 (which would typically be slower).

The Data Protection Level Selection Process:

Referring also to FIGS. 3-9 and in some implementations, data protection level selection process 10 may receive 300 telemetry data associated with a plurality of storage devices. A storage device reliability level may be defined 302 for each storage device of the plurality of storage devices based upon, at least in part, the telemetry data associated with the plurality of storage devices. Each storage device of the plurality of storage devices may be partitioned 304 into a plurality of storage device segments. A storage device segment reliability level may be defined 306 for the plurality of storage device segments based upon, at least in part, the storage device reliability level of the plurality of storage devices. A subset of the plurality of storage device segments may be combined 308, thus defining a storage device segment extent. A Redundant Array Of Independent Disks (RAID) level for the storage device segment extent may be selected 310 based upon, at least in part, the storage device segment reliability level of each storage device segment of the storage device segment extent.

As will be discussed in greater detail below, implementations of the present disclosure may apply different RAID levels to different storage device segment extents taking into account the reliability of the physical drives corresponding to each storage device segment extent's storage device segments. Physical drives often fail and the most common way to protect the data is to apply a certain RAID technology by distributing the data and the parity (i.e., error correction codes) between different physical drives. If a physical drive fails, data can be restored from the other physical drives. However, different physical drives have different error rates and, therefore, different probability of a fault. If a group of physical drives has multiple faulty drives, the probability of data loss increases.

This problem may affect legacy or conventional RAID groups and may be even more dangerous for Mapped RAID groups. A Mapped RAID group may generally include a RAID group formed from a dynamic pool. In a dynamic pool, physical drives may be partitioned into drive extents or storage device segments. These storage device segments may be combined into storage device segment extents, which are spread across multiple drives. The number of drive extents within a storage device segment extent may depend on the RAID type and width. For example, a RAID 5 (4+1) storage device segment extent contains five storage device segments. For redundancy purposes, a storage system may ensure that no storage device segment extent contains two storage device segments from the same drive or storage device. In some implementations, each storage device segment may only be part of one storage device segment extent. A RAID group in a dynamic pool may be a collection of storage device segment extents. The number and size of RAID groups in a dynamic pool can vary depending on the number of drives and how the pool is created and expanded. In some implementations, a storage device segment extent may only be part of one RAID group. As such, a Mapped RAID group may include greater numbers of storage devices into a single failure domain.

As different drives in a storage system may have different health or reliability levels, the number of drives that can fail may become problematic for data protection. For example, with greater numbers of physical drives, as in the case of a Mapped RAID group, the difference between the healthiness or reliability of physical drives may become more important. It is very possible that one storage device segment extent will include storage segments from healthy or reliable drives, whereas another storage device segment extent may include storage segments from less reliable physical drives with a higher fault probability. As a result, the level of data protection guaranteed by the RAID type may be not acceptable for some storage device segment extents. Alternatively, a RAID level can be excessive for other storage device segment extents with storage segments from more healthy or reliable physical drives. Accordingly, implementations of the present disclosure may address this challenge by applying different RAID levels to different storage device segment extents taking into the account the reliability of the physical drives corresponding to its storage device segments.

In some implementations, data protection level selection process 10 may receive 300 telemetry data associated with a plurality of storage devices. Telemetry data may generally include the collection of measurements or other data from a storage device for monitoring. Referring again to the example of FIG. 2 and in some implementations, storage processor 100 may be configured to receive telemetry data (e.g., telemetry data 126) when processing one or more IO requests (e.g., IO request 20) for one or more storage devices (e.g., storage targets 102, 104, 106, 108, 110). From the telemetry data (e.g., telemetry data 126), data protection level selection process 10 may identify one or more telemetry data attributes or parameters. Examples of telemetry data attributes may generally include a number of read errors, a number of seek errors (e.g., errors associated with locating a specific piece of stored data), a count of relocated sectors (e.g., when a storage device finds a read/write/verification error, this sector is marked as "reallocated" and the storage device transfers data to a special reserved area (spare area)), throughput performance data, program operation failures, erase operation failures, etc. In some implementations, the telemetry data may include Self-Monitoring, Analysis and Reporting Technology (SMART) data reported by and associated with a plurality of storage devices. As known in the art, SMART data may include various attributes (e.g., read error rate, throughput performance, seek error rate, etc.).

In some implementations, data protection level selection process 10 may define 302 a storage device reliability level for each storage device of the plurality of storage devices based upon, at least in part, the telemetry data associated with the plurality of storage devices. A storage device reliability level may generally include a classification or metric indicating a probability of failure of a storage device (e.g., storage targets 102, 104, 106, 108, 110) based upon, at least in part, the telemetry data (e.g., telemetry data 126). As discussed above and in some implementations, the telemetry data (e.g., telemetry data 126) may include various attributes indicative of the status of each of the plurality of storage devices (e.g., storage targets 102, 104, 106, 108, 110). In some implementations, data protection level selection process 10 may define 302 a storage device reliability level for each storage device based upon, at least in part, the attributes of the telemetry data.

In some implementations, defining 302 the storage device reliability level for the plurality of storage devices may include comparing 312 the telemetry data to one or more threshold reliability values. For example and in some implementations, for a particular attribute of the telemetry data, data protection level selection process 10 may evaluate the corresponding health/reliability of the plurality of storage devices. In some implementations, data protection level selection process 10 may compare 312 the current value of each attribute with a corresponding threshold value. In some implementations, the threshold value for each attribute of the telemetry data may be predefined, user-defined, and/or automatically defined by data protection level selection process 10. In some implementations, data protection level selection process 10 may assign each storage device with a set of health indicators (e.g., one for each attribute of the telemetry data). From these sets of health indicators, data protection level selection process 10 may define 302 a storage device reliability level. In some implementations, data protection level selection process 10 may define the storage device reliability level based upon, at least in part, the worst health indicator(s) from the set of health indicators. For example, suppose storage target 102 provides telemetry data indicating a e.g., read error rate greater than a predefined threshold read error rate and other attributes below one or more other threshold reliability values. In this example, because storage target 102 has at least one health indicator (e.g., read error rate) that indicates an issue with the reliability of storage target 102, data protection level selection process 10 may define 302 the storage device reliability level for storage target 102 as unreliable (as will be discussed in greater detail below).

In another example, data protection level selection process 10 may use a weighted score of the set of health indicators. In some implementations, the weight(s) for each health indicator may be predefined, user-defined, and/or automatically defined by data protection level selection process 10. Returning again to the above example of storage target 102, suppose that the read error rate has a relatively low reliability weight compared to the other reliability weights associated with the other health indicators. In this example, because of the weighted score of the set of health indicators, data protection level selection process 10 may define 302 storage target 102 as reliable (as will be discussed in greater detail below).

In some implementations, defining 302 the storage device reliability level for the plurality of storage devices may include defining 314 the reliability level for each storage device as one of reliable and unreliable. As discussed above and in some implementations, the telemetry data (e.g., telemetry data 126) received from a storage device (e.g., storage targets 102, 104, 106, 108, 110) may indicate that the storage device is failing. For example and as discussed above, attributes of the telemetry data may be used to generate a set of health indicators and based on the health indicators, data protection level selection process 10 may determine that a storage device is reliable (e.g., low probability of failing) or unreliable (e.g., high probability of failing). In some implementations, defining 314 the reliability level may be based on one or more thresholds and/or a weighted score of health indicators. In this manner, a reliable reliability level may be defined 314 for a storage target with a probability of failure lower than a predefined threshold. Similarly, an unreliable reliability level may be defined 314 for a storage target with a probability of failure higher than a predefined threshold. In some implementations, an unreliable reliability level may not indicate that a storage device should be replaced immediately. Rather, an unreliable reliability level may indicate that the storage device is operational but has a failure probability higher than a threshold associated with reliable storage devices. While examples of reliable and unreliable reliability levels have been discussed, it will be appreciated that other reliability levels or scores may be used within the scope of the present disclosure.

Figure 4:
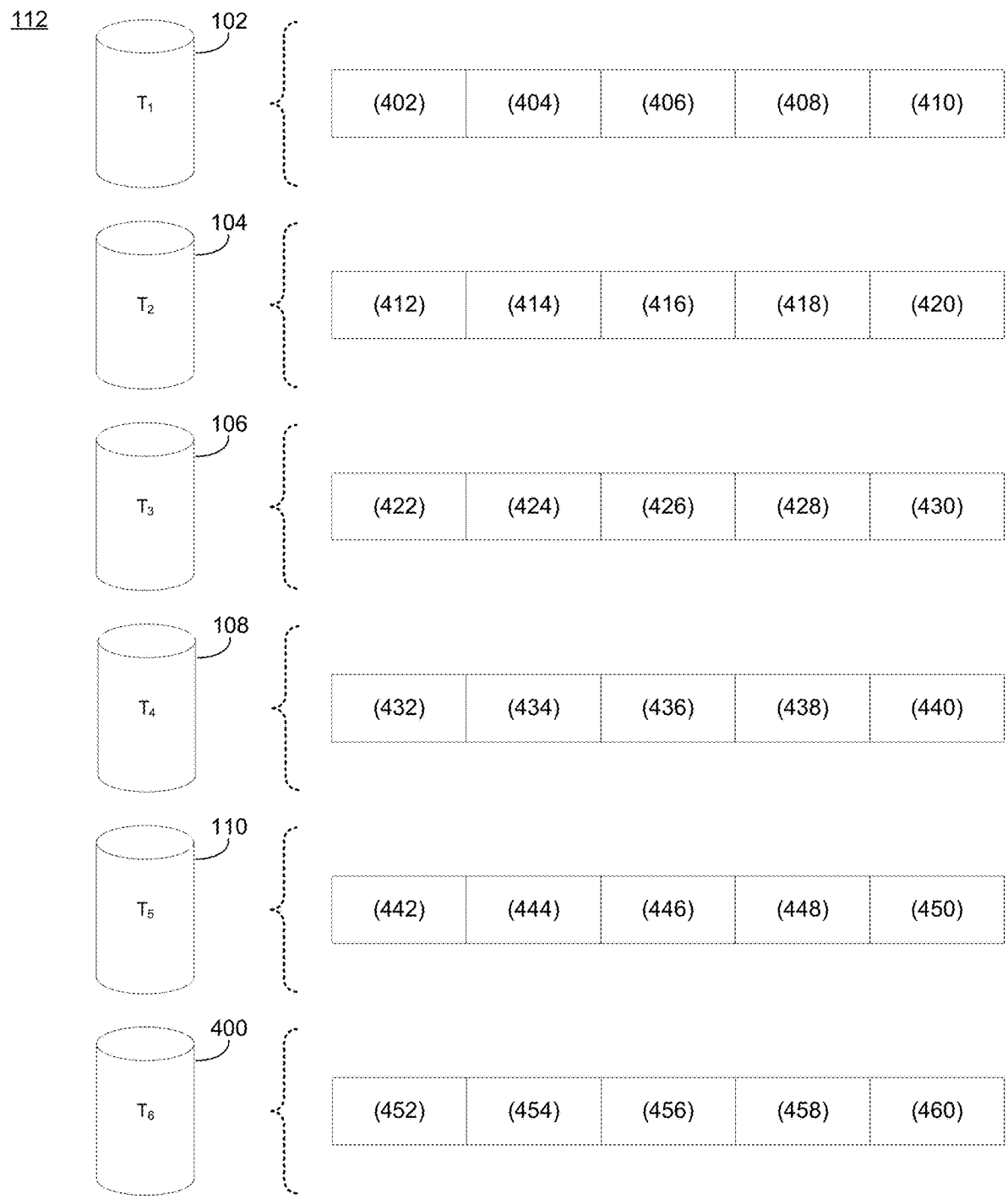
FIG. 4 is an example diagrammatic view of the storage system of FIG. 1 according to one or more example implementations of the disclosure.

In some implementations, data protection level selection process 10 may partition 304 each storage device of the plurality of storage devices into a plurality of storage device segments. Referring also to the example of FIG. 4 and in some implementations, data array 112 may include a plurality of storage devices (e.g., storage targets 102, 104, 106, 108, 110, 400). While FIG. 4 includes five storage targets, it will be appreciated that any number of storage targets may be used within the scope of the present disclosure. As shown in the example of FIG. 4, suppose each storage device includes memory space that can be divided into a plurality of storage device segments. In some implementations, each storage device segment may represent a portion of memory space of the storage device. In some implementations, each storage device segment may represent a block of memory space (e.g., 512 bytes for hard disk drives (HDDs) and between 256 kilobytes and 4 megabytes for solid-state drives (SSDs)). While example block sizes have been provided, it will be appreciated that any block size may be used within the scope of the present disclosure. In some implementations, each storage device segment may include a plurality of blocks of memory space (e.g., 50 gigabytes) from the storage device. However, it will be appreciated any number of blocks of memory space may be partitioned into a storage device segment within the scope of the present disclosure.

As shown in the example of FIG. 4 and in some implementations, storage target 102 may be partitioned 304 into a plurality of storage device segments (e.g., storage device segments 402, 404, 406, 408, 410); storage target 104 may be partitioned 304 into a plurality of storage device segments (e.g., storage device segments 412, 414, 416, 418, 420); storage target 106 may be partitioned 304 into a plurality of storage device segments (e.g., storage device segments 422, 424, 426, 428, 430); storage target 108 may be partitioned 304 into a plurality of storage device segments (e.g., storage device segments 432, 434, 436, 438, 440); storage target 110 may be partitioned 304 into a plurality of storage device segments (e.g., storage device segments 442, 444, 446, 448, 450); and storage target 400 may be partitioned 304 into a plurality of storage device segments (e.g., storage device segments 442, 444, 446, 448, 450). While the example of FIG. 4 includes five storage device segments, it will be appreciated that any portion of the memory space of each storage device may be partitioned 304 into any number of storage device segments.

In some implementations, data protection level selection process 10 may define 306 a storage device segment reliability level for the plurality of storage device segments based upon, at least in part, the storage device reliability level of the plurality of storage devices. In some implementations, data protection level selection process 10 may define 306 a storage device segment reliability level for every storage device segment in the pool based on the storage device reliability level of its parent storage device. Referring again to the example of FIG. 4 and in some implementations, suppose data protection level selection process 10 defines 304 storage targets 102, 104, 106, 108, 110, 400 with a storage device reliability level based upon, at least in part, telemetry data received 300 from each storage target. In this example, further suppose data protection level selection process 10 defines 304 storage targets 102, 104, 106, 108, 110, 400 with a storage device reliability level of reliable.

In some implementations, defining 306 the storage device segment reliability level for the plurality of storage device segments may include defining 316 the reliability level for each storage device segment as one of reliable and unreliable. Continuing with the previous example, data protection level selection process 10 may define 306 storage device segments 402, 404, 406, 408, 410 with a reliable reliability level based on the reliable reliability level of storage device 102; storage device segments 412, 414, 416, 418, 420 with a reliable reliability level based on the reliable reliability level of storage device 104; storage device segments 422, 424, 426, 428, 430 with a reliable reliability level based on the reliable reliability level of storage device 106; storage device segments 432, 434, 436, 438, 440 with a reliable reliability level based on the reliable reliability level of storage device 108; storage device segments 442, 444, 446, 448, 450 with a reliable reliability level based on the reliable reliability level of storage device 110; and storage device segments 452, 454, 456, 458, 460 with a reliable reliability level based on the reliable reliability level of storage device 400.

In some implementations, data protection level selection process 10 may combine 308 a subset of the plurality of storage device segments, thus defining a storage device segment extent. As discussed above and in some embodiments, data protection level selection process 10 may combine 308 a subset of storage device segments from the plurality of storage device segments from the plurality of storage devices into a storage device segment extent. Referring also to the example of FIG. 5 and in some implementations, data protection level selection process 10 may combine 308 storage device segments 402, 412, 422, 432, 442 into storage device segment extent 500; storage device segments 452, 404, 414, 424, 434 into storage device segment extent 502; storage device segments 444, 454, 406, 416, 426 into storage device segment extent 504; storage device segments 436, 446, 456, 408, 418 into storage device segment extent 506; storage device segments 428, 438, 448, 458, 410 into storage device segment extent 508; and storage device segments 420, 430, 440, 450, 460 into storage device segment extent 510. While the example of FIG. 5 has five storage device segments in each storage device segment extent, it will be appreciated that any number of storage device segments may be combined 308 into any number or combination of storage device segment extents.

In some implementations, data protection level selection process 10 may select 310 a Redundant Array Of Independent Disks (RAID) level for the storage device segment extent based upon, at least in part, the storage device segment reliability level of each storage device segment of the storage device segment extent. As will be discussed in greater detail below, by selecting 310 the RAID level for the storage device segment extent based upon, at least in part, the storage device segment reliability level of each storage device segment of the storage device segment extent, data protection level selection process 10 allows for changes in the combinations of storage device segment extents (including changes in the underlying storage devices) to drive the RAID level selection for a storage device segment extent to ensure consistent data protection. For example, suppose storage device segment extent 500 is modified by replacing a storage device extent with another storage device extent from another storage device. The new storage device segment may be from a storage device with a different reliability level and, as such, a different probability of failure. By selecting 310 the RAID level for the storage device segment extent based on the storage device segment reliability level of each storage device segment, including the newly added storage device segment, data within the storage device segment extent may be preserved by selecting 310 an appropriate RAID level in light of the new storage device segment reliability levels. In some implementations, combining 308 a subset of the plurality of storage device segments and selecting 310 a Redundant Array Of Independent Disks (RAID) level for the storage device segment extent based upon, at least in part, the storage device segment reliability level of each storage device segment of the storage device segment extent may occur concurrently and/or in reverse order. In other words, data protection level selection process 10 may combine 308 the subset of storage device segments into a storage device segment extent based upon, at least in part, a RAID level selected 310 for the storage device segment extent based on the storage device segment reliability level of each storage device segment.

In some implementations, selecting 310 the RAID level for the storage device segment extent may include identifying 318 a number of reliable storage device segments and a number of unreliable storage device segments in the storage device segment extent. For example, by identifying 318 the number of reliable and unreliable storage device segments of as storage device segment extent, the reliability of a storage device segment extent can be calculated, and the probability of the single, double, and/or triple failure can be estimated. In some implementations, for every unreliable storage device segment within a storage device segment extent, data protection level selection process 10 may identify the possibility of a fault or an additional fault in the case of multiple unreliable storage device segments.

Figure 5:
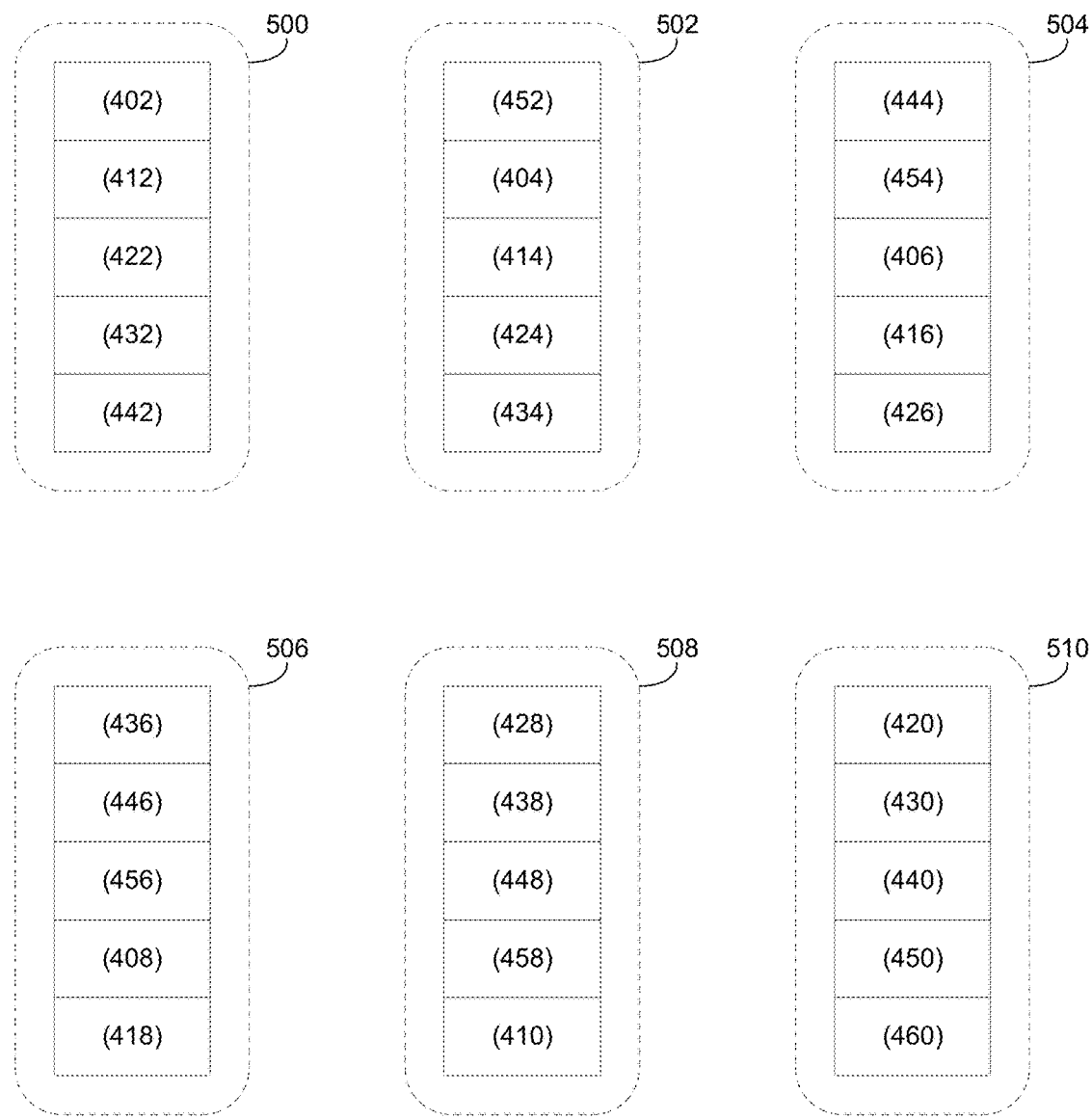
FIGS. 5-6 are example diagrammatic views of storage device segment extents according to one or more example implementations of the disclosure.

Therefore and in some implementations, selecting 310 the RAID level for the storage device segment extent may include one or more of: selecting 320 a RAID level with a single parity when each storage device segment of the storage device segment extent is reliable, selecting 322 a RAID level with a double parity when only one storage device segment of the storage device segment extent is unreliable, and selecting 324 a RAID level with mirroring protection when more than one storage device segment is unreliable. Referring again to the example of FIG. 5 and in some implementations, suppose data protection level selection process 10 defines 306 each storage device segment of each storage device segment extent (e.g., storage device segment extents 500, 502, 504, 506, 508, 510) as reliable. In this example, data protection level selection process 10 may select 320 a RAID level with a single parity because each storage device segment of the storage device segment extent is reliable. In the example of FIG. 5, data protection level selection process 10 may select 320 a RAID 4+1 level.

Figure 6:
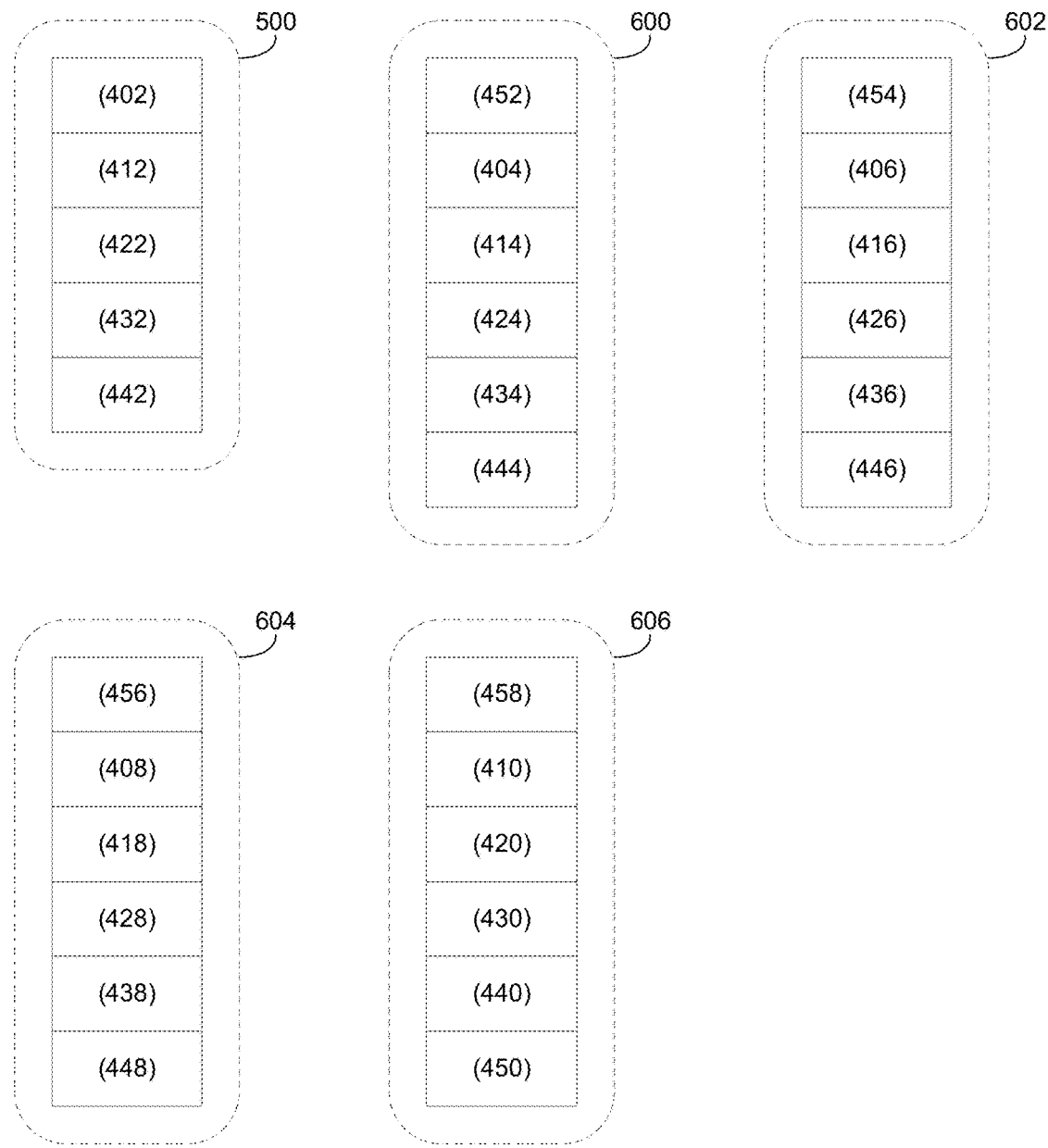

Referring also to the example of FIG. 6, suppose data protection level selection process 10 defines 302 storage device 400 as unreliable and storage devices 102, 104, 106, 108, 110 as reliable. Accordingly, data protection level selection process 10 may define 306 storage device segments 452, 454, 456, 458, 460 as unreliable. In this example, data protection level selection process 10 may select 320 a RAID level with a single parity for storage device segment extent 500 because each storage device segment of storage device segment extent 500 is reliable. Data protection level selection process 10 may select 322 a RAID level with a double parity for storage device segment extents 600, 602, 604, 606 because only one storage device segment (e.g., storage device segments 452, 454, 456, 458) of each storage device segment extent (e.g., storage device segment extents 600, 602, 604, 606) is unreliable.

Figure 7:
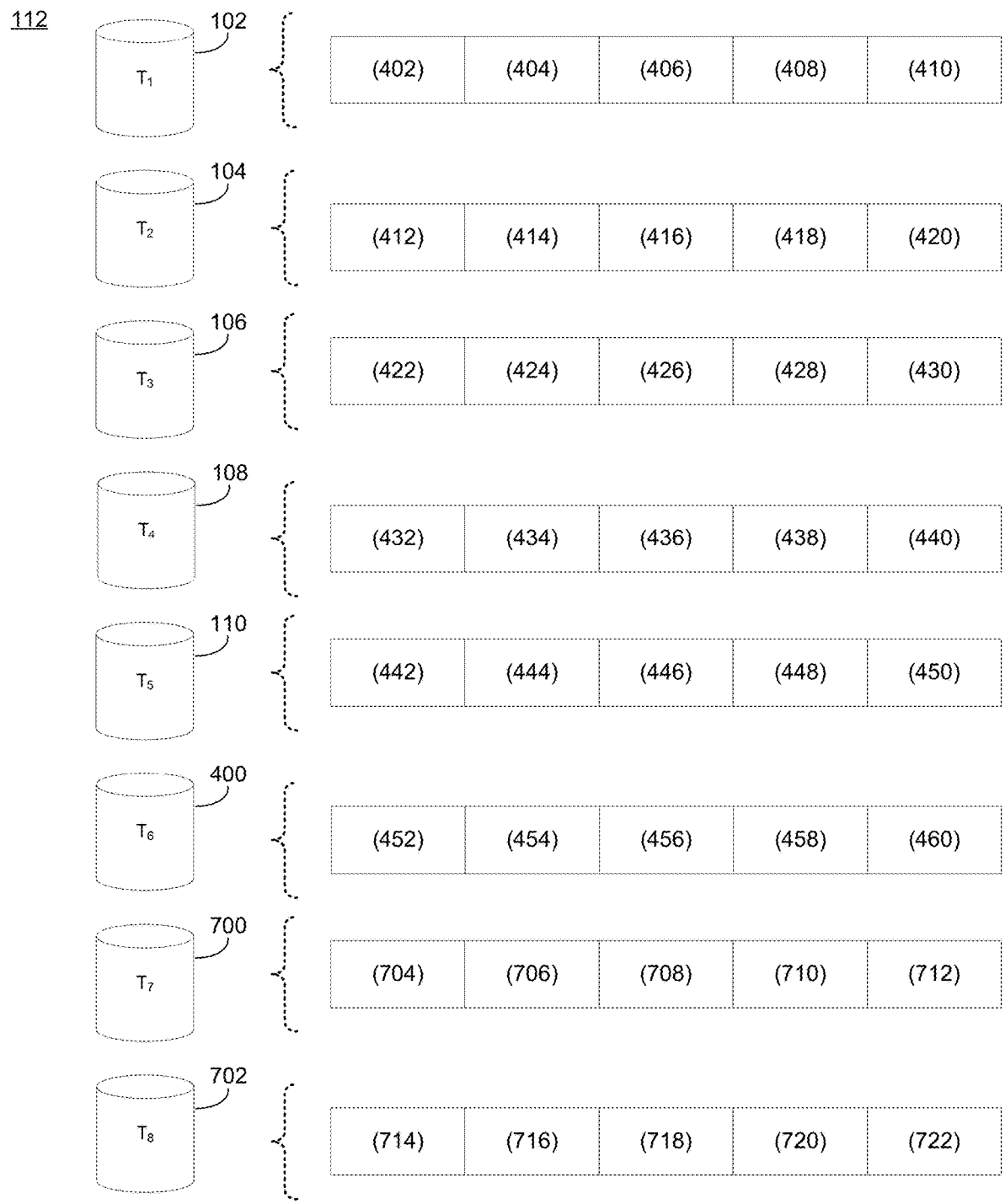
FIG. 7 is an example diagrammatic view of the storage system of FIG. 1 according to one or more example implementations of the disclosure.
Figure 8:
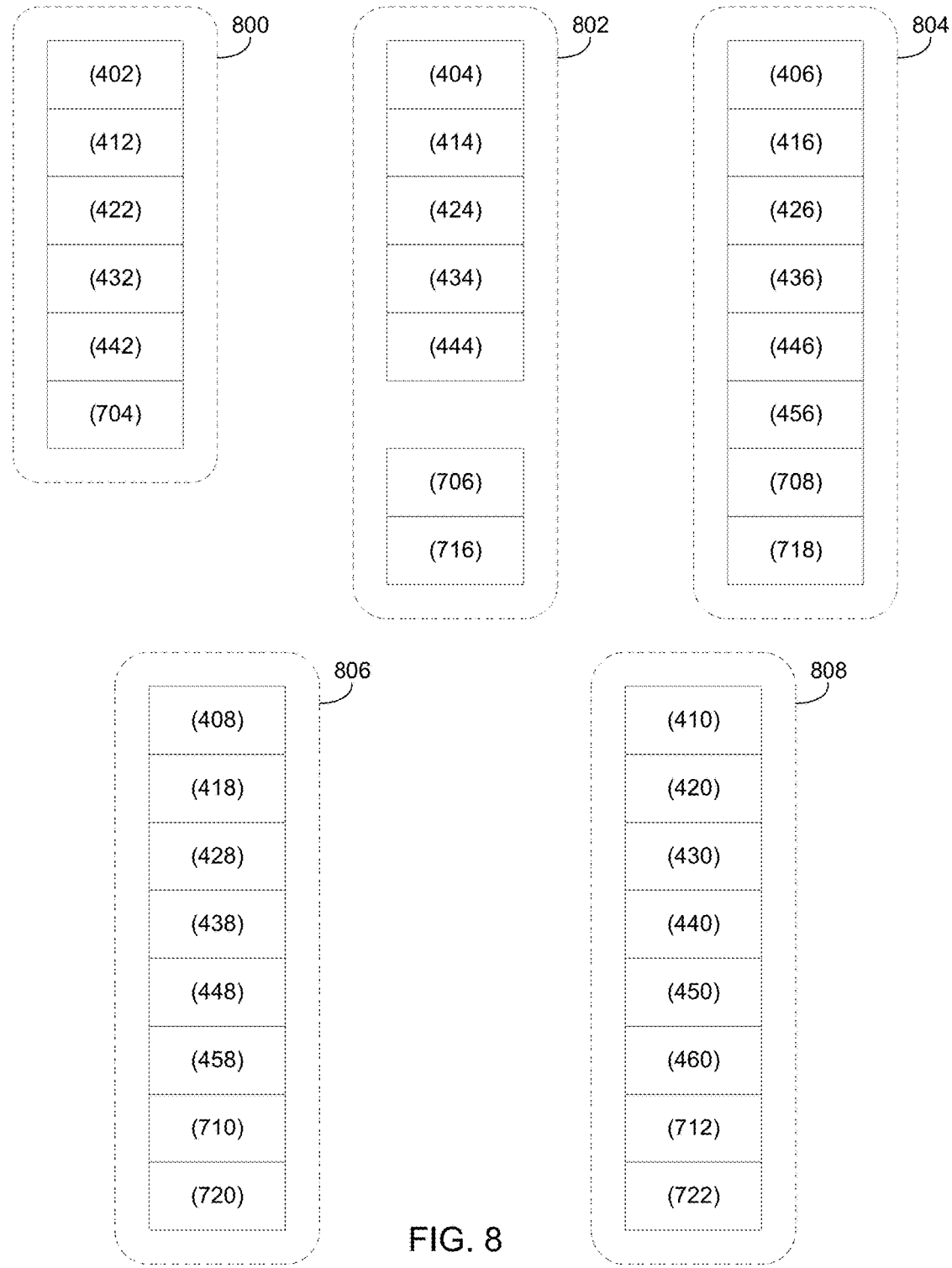
FIGS. 8-9 are example diagrammatic views of storage device segment extents according to one or more example implementations of the disclosure.

Referring also to the example of FIG. 7 and in some implementations, suppose data protection level selection process 10 defines 302 more than one storage device (e.g., storage devices 102, 104, 106) as unreliable and the other storage devices (e.g., storage devices 108, 110, 400, 700, 702) as reliable. In some implementations, data protection level selection process 10 may define 306 storage device segments of storage devices 102, 104 as unreliable and storage device segments of storage devices 108, 110, 400, 700, 702 as reliable. Referring also to the example of FIG. 8 and in some implementations, data protection level selection process 10 may combine 308 storage device segments into one or more storage device segment extents. For example, data protection level selection process 10 may combine 308 storage device segments 402, 412, 422, 432, 442, 452, 704, 714 into storage device segment extent 800; storage device segments 404, 414, 424, 434, 444, 454, 706, 718 into storage device segment extent 802; storage device segments 406, 416, 426, 436, 446, 456, 708, 716 into storage device segment extent 804; storage device segments 408, 418, 428, 438, 448, 458, 710, 720 into storage device segment extent 806; and storage device segments 410, 420, 430, 440, 450, 460, 712, 722 into storage device segment extent 808. In this example, data protection level selection process 10 may identify more than one unreliable storage device segment in a storage device segment extent and may select 324 a RAID level with mirroring protection because more than one storage device segment is unreliable. In this example, data protection level selection process 10 may select 324 a RAID level with mirroring protection (e.g., RAID 4+4 mirroring) for storage device segment extents 800, 802, 804, 806, 808 because more than one storage device segment (e.g., storage device segments 402, 404, 406 408, 410, 412, 414, 416, 418, 420) is defined as unreliable. As discussed above and in some implementations, combining 308 the storage device segments into one or more storage device segment extents may be concurrent with and/or in response to selecting a RAID level for the storage device segment extent.

In some implementations, data protection level selection process 10 may add 326 one or more storage device segments to the storage device segment extent based upon, at least in part, the selected RAID level for the storage device segment extent. In some implementations, content of a storage device segment may be moved from one storage device to another storage device (e.g., during performance and wear balancing). Accordingly, the reliability level for a storage device segment extent may change over time as storage device segments are modified within a storage device segment extent. Additionally, the probability of a storage device's failure may change over time. For example, the count of certain errors can pass a predefined threshold for a particular storage device causing data protection level selection process 10 to define storage device as unreliable. In some implementations, data protection level selection process 10 may allow the RAID level selection to change dynamically by adding 326 one or more storage device segments to a storage device segment extent and/or by removing 328 one or more storage device segments from a storage device segment extent.

Figure 9:
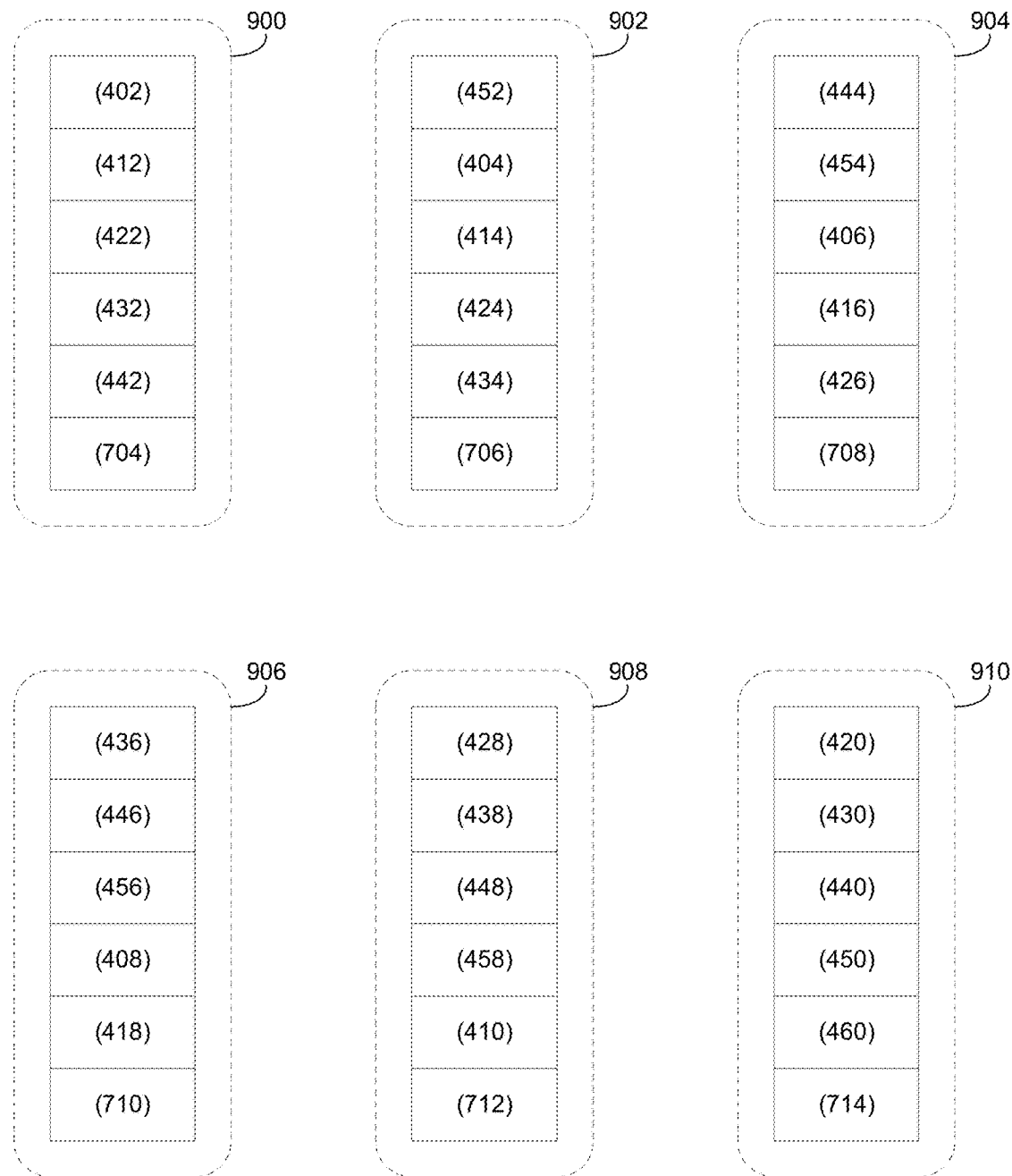

Referring again to the example of FIGS. 5, 7, and 9, suppose data array 112 has e.g., eight storage devices with six storage devices (e.g., storage devices 102, 104, 106, 108, 110, 400) partitioned into storage device segments and storage device segment extents as shown in FIG. 5. Further suppose that storage device 108 is determined by data protection level selection process 10 to be unreliable (e.g., based on telemetry data received 300 from storage device 108). In this example, because storage device segment extents 500, 502, 504, 506, 508, 510 each include storage device segments from storage device 108 (e.g., storage device segments 432, 434, 436, 438, 440), data protection level selection process 10 may add 326 a storage device segment to each storage device segment extent with storage device segments from storage device 700 and storage device 702 (e.g., storage device segment extents 704, 706, 708, 710, 712, 714). In this example, data protection level selection process 10 may change the 4+1 RAID level of storage device segment extents 500, 502, 504, 506, 508, 510 into a 4+2 RAID level by allocating one more storage device segment to e.g., calculate q-parity for the data in the first four storage device segments of each storage device segment extent.

In some implementations, data protection level selection process 10 may remove 328 one or more storage device segments from the storage device segment extent based upon, at least in part, the selected RAID level for the storage device segment extent. Referring again to the example of FIGS. 5 and 9 and continuing with the above example involving unreliable storage device 108, further suppose that storage device 108 is determined by data protection level selection process 10 to be reliable (e.g., in response to storage device 108 being repaired or replaced). In this example, data protection level selection process 10 may determine that because storage device segment extents 900, 902, 904, 906, 908, 910 each include only reliable storage device segments, data protection level selection process 10 may change the RAID level of storage device segment extents 900, 902, 904, 906, 908, 910 from a RAID 4+2 level to a RAID 4+1 level by removing 328 a storage device segment with q-parity from each storage device segment extent. Accordingly, data protection level selection process 10 may remove 328 one or more storage device segments from each storage device segment extent. In this example, data protection level selection process 10 may remove storage device segments 704, 706, 708, 710, 712, 714, resulting in storage device segment extents 500, 502, 504, 506, 508, 510.

General:

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to implementations of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various implementations of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular implementations only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various implementations with various modifications as are suited to the particular use contemplated.

A number of implementations have been described. Having thus described the disclosure of the present application in detail and by reference to implementations thereof, it will be apparent that modifications and variations are possible without departing from the scope of the disclosure defined in the appended claims.

What is claimed is:

1. A computer-implemented method, executed on a computing device, comprising:
   receiving, via the computing device, telemetry data associated with a plurality of storage devices;
   defining a storage device reliability level for each storage device of the plurality of storage devices based upon, at least in part, the telemetry data associated with the plurality of storage devices, wherein the storage device reliability level for each storage device is a weighted score of a set of health indicators;
   partitioning each storage device of the plurality of storage devices into a plurality of storage device segments;
   defining a storage device segment reliability level for the plurality of storage device segments based upon, at least in part, the storage device reliability level of the plurality of storage devices;
   combining a subset of the plurality of storage device segments, thus defining a storage device segment extent; and
   defining a storage device segment extent reliability level for the storage device segment extent based upon, at least in part, the storage device segment reliability level of each storage device segment of the storage device segment extent; and
   selecting a Redundant Array Of Independent Disks (RAID) level for the storage device segment extent based upon, at least in part, the storage device segment extent reliability level.

2. The computer-implemented method of claim 1, wherein defining the storage device reliability level for the plurality of storage devices includes comparing the telemetry data to one or more threshold reliability values.

3. The computer-implemented method of claim 1, wherein defining the storage device reliability level for the plurality of storage devices includes defining the reliability level for each storage device as one of reliable and unreliable.

4. The computer-implemented method of claim 3, wherein defining the storage device segment reliability level for the plurality of storage device segments includes defining the reliability level for each storage device segment as one of reliable and unreliable.

5. The computer-implemented method of claim 4, wherein selecting the RAID level for the storage device segment extent includes identifying a number of reliable storage device segments and a number of unreliable storage device segments in the storage device segment extent.

6. The computer-implemented method of claim 5, wherein selecting the RAID level for the storage device segment extent includes one or more of:
   selecting a RAID level with a single parity when each storage device segment of the storage device segment extent is reliable,
   selecting a RAID level with a double parity when only one storage device segment of the storage device segment extent is unreliable, and
   selecting a RAID level with mirroring protection when more than one storage device segment is unreliable.

7. The computer-implemented method of claim 1, further comprising at least one of:
   adding one or more storage device segments to the storage device segment extent based upon, at least in part, the selected RAID level for the storage device segment extent, and
   removing one or more storage device segments from the storage device segment extent based upon, at least in part, the selected RAID level for the storage device segment extent.

8. A computer program product residing on a non-transitory computer readable medium having a plurality of instructions stored thereon which, when executed by a processor, cause the processor to perform operations comprising:
   receiving telemetry data associated with a plurality of storage devices;
   defining a storage device reliability level for each storage device of the plurality of storage devices based upon, at least in part, the telemetry data associated with the plurality of storage devices, wherein the storage device reliability level for each storage device is a weighted score of a set of health indicators;
   partitioning each storage device of the plurality of storage devices into a plurality of storage device segments;
   defining a storage device segment reliability level for the plurality of storage device segments based upon, at least in part, the storage device reliability level of the plurality of storage devices;
   combining a subset of the plurality of storage device segments, thus defining a storage device segment extent; and
   defining a storage device segment extent reliability level for the storage device, segment extent based upon, at least in part, the storage device segment reliability level of each storage device segment of the storage device segment extent; and
   selecting a Redundant Array Of Independent Disks (RAID) level for the storage device segment extent based upon, at least in part, the storage device segment extent reliability level.

9. The computer program product of claim 8, wherein defining the storage device reliability level for the plurality of storage devices includes comparing the telemetry data to one or more threshold reliability values.

10. The computer program product of claim 8, wherein defining the storage device reliability level for the plurality of storage devices includes defining the reliability level for each storage device as one of reliable and unreliable.

11. The computer program product of claim 10, wherein defining the storage device segment reliability level for the plurality of storage device segments includes defining the reliability level for each storage device segment as one of reliable and unreliable.

12. The computer program product of claim 11, wherein selecting the RAID level for the storage device segment extent includes identifying a number of reliable storage device segments and a number of unreliable storage device segments in the storage device segment extent.

13. The computer program product of claim 12, wherein selecting the RAID level for the storage device segment extent includes one or more of:
   selecting a RAID level with a single parity when each storage device segment of the storage device segment extent is reliable,
   selecting a RAID level with a double parity when only one storage device segment of the storage device segment extent is unreliable, and
   selecting a RAID level with mirroring protection when more than one storage device segment is unreliable.

14. The computer program product of claim 8, further comprising at least one of:
   adding one or more storage device segments to the storage device segment extent based upon, at least in part, the selected RAID level for the storage device segment extent, and
   removing one or more storage device segments from the storage device segment extent based upon, at least in part, the selected RAID level for the storage device segment extent.

15. A computing system comprising:
   a memory architecture; and
   a processor configured to receive telemetry data associated with a plurality of storage devices, the processor further configured to define a storage device reliability level for each storage device of the plurality of storage devices based upon, at least in part, the telemetry data associated with the plurality of storage devices, wherein the storage device reliability level for each storage device is a weighted score of a set of health indicators, wherein the processor is further configured to partition each storage device of the plurality of storage devices into a plurality of storage device segments, wherein the processor is further configured to define a storage device segment reliability level for the plurality of storage device segments based upon, at least in part, the storage device reliability level of the plurality of storage devices, the processor further configured to combine a subset of the plurality of storage device segments, thus defining a storage device segment extent, wherein the processor is further configured to define a storage device segment extent reliability level for the storage device segment extent based upon, at least in part, the storage device segment reliability level of each storage device segment of the storage device segment extent, and wherein the processor is further configured to select a Redundant Array Of independent Disks (RAID) level for the storage device segment extent based upon, at least in part, the storage device segment extent reliability level.

16. The computing system of claim 15, wherein defining the storage device reliability level for the plurality of storage devices includes comparing the telemetry data to one or more threshold reliability values.

17. The computing system of claim 15, wherein defining the storage device reliability level for the plurality of storage devices includes defining the reliability level for each storage device as one of reliable and unreliable.

18. The computing system of claim 17, wherein defining the storage device segment reliability level for the plurality of storage device segments includes defining the reliability level for each storage device segment as one of reliable and unreliable.

19. The computing system of claim 15, wherein selecting the RAID level for the storage device segment extent includes identifying a number of reliable storage device segments and a number of unreliable storage device segments in the storage device segment extent.

20. The computing system of claim 15, wherein selecting the RAID level for the storage device segment extent includes one or more of:
- selecting a RAID level with a single parity when each storage device segment of the storage device segment extent is reliable,
- selecting a RAID level with a double parity when only one storage device segment of the storage device segment extent is unreliable, and
- selecting a RAID level with mirroring protection when more than one storage device segment is unreliable.

* * * * *